United States Patent [19]
Khodov et al.

[11] Patent Number: 5,356,455
[45] Date of Patent: Oct. 18, 1994

[54] PROCESS FOR RECOVERING LEAD FROM LEAD-CONTAINING RAW MATERIALS

[75] Inventors: Nikolai V. Khodov, Vladikavkaz; Mikhail P. Smirnov, Moscow; Oleg K. Kuznetsov, Vladikavkaz; Konstantin M. Smirnov, Moscow, all of Russian Federation

[73] Assignee: Nikolai Vladimirovich Khodov, Vladikavkaz,

[21] Appl. No.: 116,321

[22] Filed: Sep. 3, 1993

[30] Foreign Application Priority Data

Sep. 14, 1992 [RU] Russian Federation ............ 5056328

[51] Int. Cl.$^5$ ............................................. C22B 13/00
[52] U.S. Cl. ........................................ 75/419; 75/696; 204/104; 423/27; 423/109
[58] Field of Search .................. 75/696, 695, 419; 204/104; 423/27, 109, 37

[56] References Cited

U.S. PATENT DOCUMENTS 4,971,662 11/1990 Sawyer et al. .................... 423/109

*Primary Examiner*—Melvyn J. Andrews
*Attorney, Agent, or Firm*—Ladas & Parry

[57] ABSTRACT

There is proposed a process for recovering lead, comprising the steps of: feeding molten caustic soda, lead-containing feed and an oxygen-containing gas into a reaction some having a temperature of 600° to 700° C. as a result of which there are obtained lead metal withdrawn from the process and a melt containing sodium sulphate, zinc and copper sulphides, and gangue. The melt is discharged from the reaction zone of subjected to a first leaching operation to obtain, as a result, a slurry representing a mixture of solid particles of sodium sulphate, zinc and copper sulphides, gangue and an aqueous solution containing essentially caustic soda. Further on, the slurry is filtered to produce a concentrated aqueous solution containing essentially caustic soda and a solid residue. The concentrated caustic soda solution is subjected to thickening by evaporation and the resulting caustic soda melt is fed into the reaction zone. The solid residue is subjected to a second leaching operation to obtain suspension which is filtered to ultimately produce a cake representing solid particles of zinc and lead sulphides, and gangue having, adsorbed on their surface, a sodium sulphate solution, and an aqueous solution containing essentially sodium sulphate. Said solution is subjected to electrochemical treatment to obtain sulphuric acid withdrawn from the process, and alkali which is fed to said first leaching operation. The cake is washed to obtain a sodium sulphate solution which is fed to said second leaching operation.

14 Claims, 1 Drawing Sheet

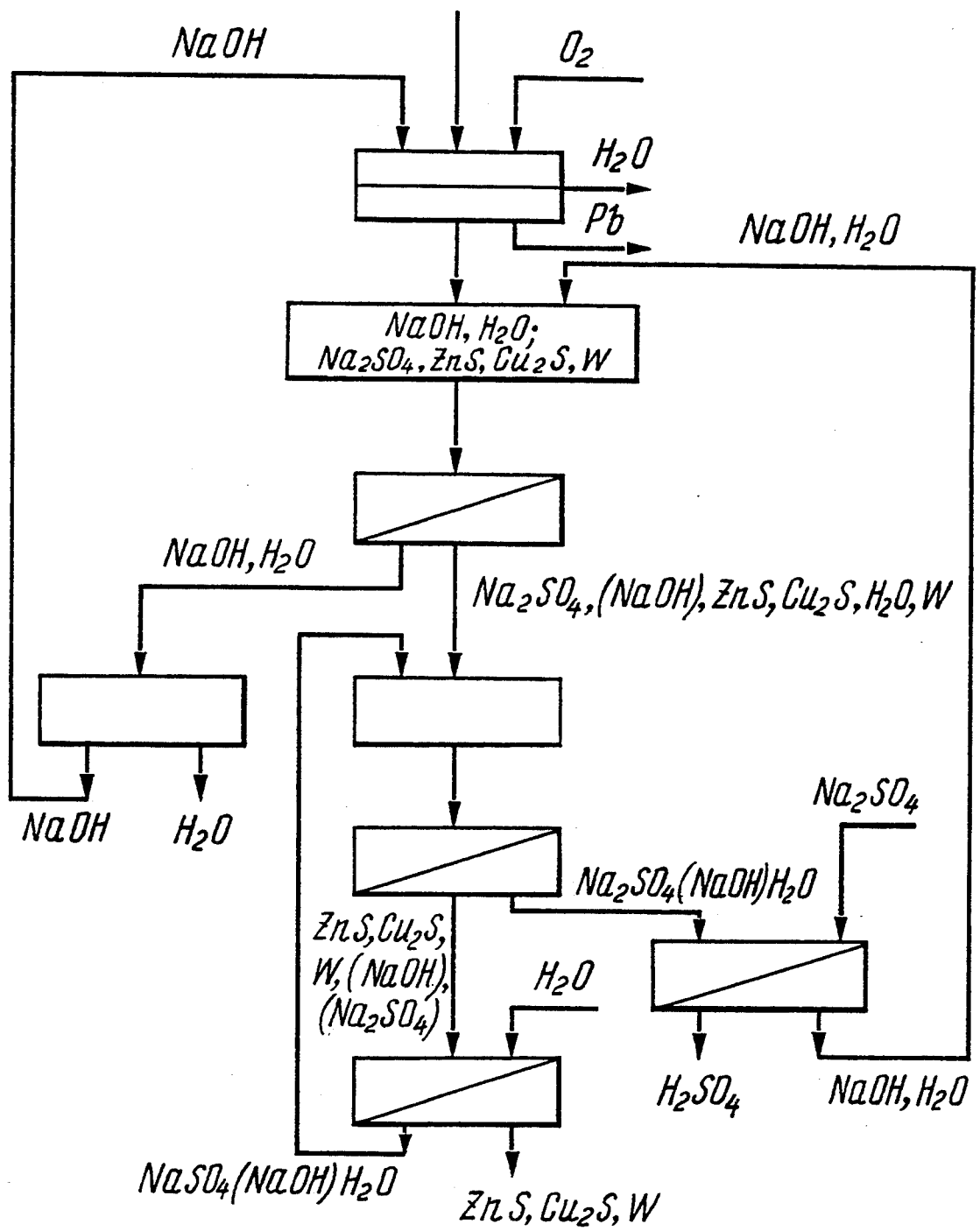

PROCESS FOR RECOVERING LEAD FROM LEAD-CONTAINING RAW MATERIALS

FIELD OF APPLICATION OF THE INVENTION

The present invention relates to non-ferrous metallurgy and, more specifically, to a process for recovering lead from lead-containing raw materials.

The present invention may be used to best advantage for recovery of lead from sulphide concentrates.

BACKGROUND OF THE PRESENT INVENTION

It is common knowledge that lead and its compounds are highly toxic. Both traditional and novel methods for producing lead are carried out at high temperatures in the order of 1200° to 1300° C. At these temperatures lead and its compounds possess a high volatility, and, as a result, the pass in considerable quantities to gas phase, thereby polluting the environment with high-toxicity lead and sulphurous gas. Not a single of the known methods for lead recovery is able to ensure adequate environmental control at operator's positions and in areas adjoining to such lead-recovering enterprises. As a result, the lead concentration in atmosphere exceeds by scores of times the limit permissible levels. Apart from it, the know methods impose restrictions upon the contents of zinc and copper admixtures in concentrates, and these restrictions make it impossible to process concentrates with lead contents of above 45%. On the other hand, use of high temperatures in production of low-melting lead is economically unjustified and, therefore, the most promising process for lead recovery is the low-temperature process described in the "Tsvetnye Metally"/ Non-Ferrous Metals J./, No. 5, 1990, Metalurgia Publishers, Moscow, pp. 34–26, FIG. 1.

The above-cited process makes provision for feeding lead-containing pulverized sulphide concentrated and molten alkali to a reaction zone in which a temperature in the order of 600°–700° C. is maintained. To provided adequate fluidity of the melt within said temperature range, caustic soda is added in excess.

The lead reduction process is the reaction zone preceeds in accordance with the following formula:

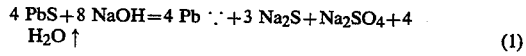

$$4\,PbS + 8\,NaOH = 4\,Pb + 3\,Na_2S + Na_2SO_4 + 4\,H_2O\uparrow \quad (1)$$

The above process gives leads yields of 96–98%.

The crude lead thus-obtained is withdrawn from the process for subsequent refining. The sulphur associated with lead reacts with caustic soda to form salts $Na_2S$ and $Na_2SO_4$ which, in addition to excess NaOH, represent the constituents of the melt. The latter also comprises sulphides of other heavy metals, such as, e.g. ZnS, $CU_2S$ and barren rock. The metal is subjected to hydrometallurgical treatment for the purpose of regeneration of alkali and for removal of zinc and copper in the form of intermediate products. To reduce sodium sulphate $Na_2SO_4$ to sodium sulphide $Na_2S$, coal or converted natural gas are introduced into the melt. The process is conducted at 800°–850° C. The melt thus-treated containing $Na_2S$ and excess caustic soda is subjected to leaching with an aqueous solution to obtain a slurry or pulp. Zinc oxide in the form of roasted cinder is added to the slurry and, as a result, of its chemical reaction with sodium sulphide, there are produced caustic soda in the form of a solution and zinc sulphide as a solid particulate matter, i.e. a slurry which is subjected to filtering. As a result of filtering, caustic soda solution and cake containing zinc sulphide and barren rock from the feed lead-containing concentrate are obtained. The caustic soda solution is directed to dewatering to eventually obtain a caustic soda melt fed to the reaction zone, while the cake is washed with water. Thereupon, the cake is dried and fired at a temperature of 950°–1000° C. to produce zinc oxide in the form of zinc cinder and sulphurous gas $SO_2$ used for the production of sulphuric acid.

Since the above-described lead recovery process is carried out within the temperature range of 600° to 700° C., considerably less lead and lead compounds pass to gas phase, thus reducing the volume of process gases by a factor of 20 to 30. As a result, the cleaning of process gases is much simplified and it becomes easier to achieve in them the prescribed permissible lead concentration. All these factors improve sanitary and hygienic work conditions, reduce gas discharges and air pollution.

It is regeneration of caustic soda from the melt that constitutes the decisive step of the above-described process. This regeneration step is not concerned with toxic lead and, on the whole, it improves the environmental aspect of the lead production. The lead produced by the above-described process is purer than that produced by any traditional method, and it contains only noble metals, bismuth and a minor amount ($\leq 0.1\%$) of copper. With the flow-sheet adopted for carrying out the above-described process, more than 98% of noble metals and bismuth are recovered from feed concentrate, while arsenic, tin, antimony pass to the melt. The absence of these impurities, particularly copper, in lead considerably simplifies the subsequent refining and makes it possible to increase the percentage of recovery of lead, noble metals and bismuth at this process step.

The above-described process makes it possible to recover lead from feed concentrates containing high percentages of zinc admixture, e.g. up to 11%, and copper, e.g. up to 20%, as well as high percentages of lead, e.g. up to 70–80%.

One of the specific features of the above-described process resides in the need to add coal or converted natural gas to the melt to reduce sodium sulphate to sodium sulphide.

This reduction process is carried out in a separate furnace unit at elevated temperatures in the order of 800°–850° C. to cause evaporation of alkali. The process is accompanied by side reactions in the melt:

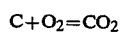

$$C + O_2 = CO_2$$

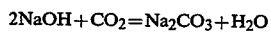

$$2NaOH + CO_2 = Na_2CO_3 + H_2O$$

leading to conversion of free caustic soda contained in the melt to sodium carbonate. This side reaction considerably complicates regeneration of caustic soda from the melt and necessirates an additional soda causticfication operation.

To carry out NaOH regeneration, the art-known process comprises the operation of treating sodium sulphide solution with zinc oxide in the form of roasted zinc cinder which is a valuable product. As a result of a reaction between sodium sulphide and zinc oxide, the latter passes to zinc sulphide. Since roasted zinc cinder is a valuable product, it must be regenerated. For this purpose, a roasting operation is carried out at high temperatures of 950° to 1000° C.

The oxidation process is accompanied by liberation of sulphurous gas $SO_2$, whereby the environmental aspects are impaired.

Also known in the prior art is another process for recovering lead from lead-containing raw materials described by M. P. Smirnov and L. N. Kudriashova in the article "Alkaline Lead Melting Process" in the "Tsvetnye Metally" /Non-Ferrous Metals Journal/, Moscow, Metallurgizdat Publishers, 1958, No. 9, pp. 14-23.

The latter process is carried out in the following manner into a reaction zone molten caustic soda and a lead-containing feed, such as, e.g. plumbiferous sulphide concentrates in the form of a powder, are fed. A temperature of 600° to 700° C. is maintained in the reaction zone. To boost up the melting process, the melt formed in the reaction zone is subjected to mechanical stirring. Melting is conducted in air atmosphere. The bulk of lead metal is at once extracted from the concentrate, and this crude lead is withdrawn from the process for subsequent refining. Sulphur and other components of the concentrate pass to the melt which is subjected to hydrometallurgical treatment for the purpose of regenerating caustic soda and for producing zinc and copper in the form of an intermediate product removed from the process.

In accordance with the reaction (I), the sulphur associated with the lead reacts with caustic soda to form salts $Na_2S$ and $Na_2SO_4$ which constitute the melt components. Regeneration of caustic soda from the melt is effected in three steps:

Ist STEP—removal of free caustic soda from the melt by conducting a first leaching operation, followed by filtering to obtain a solid residue to be subjected to a second leaching operation;

IInd STEP—sulphidization of the solution obtained by said second leaching operation and containing mainly sodium sulphate by using barium sulphide;

IIIrd STEP—caustification of the solution obtained by sulphidization treatment and containing mainly sodium sulphide by using copper oxide.

Upon completion of the 1st regeneration step, a strong $Na_2OH$ solution is obtained. However, sodium sulphide $Na_2S$ from the melt partially passes to the strong NaOH solution, and partially to a solid residue mainly containing sodium sulphate $Na_2SO_4$.

The 2nd step of caustic soda regeneration proceeds as follows:

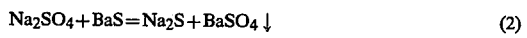

$$Na_2SO_4 + BaS = Na_2S + BaSO_4 \downarrow \quad (2)$$

The precipitated $BaSO_4$ is subjected to treatment, in the course of which it is thermally reduced with carbon at the temperatures of above 1000° C. to obtain gaseous carbon dioxide $CO_2$ and barium sulphide BaS returned back to the IInd alkali regeneration step.

The IIIrd step of caustic soda regeneration proceeds as follows:

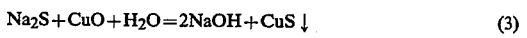

$$Na_2S + CuO + H_2O = 2NaOH + CuS \downarrow \quad (3)$$

The precipitated CuS is subjected to thermal oxidation with oxygen of the air at a temperature of above 1000° C. As a result of thermal oxidation, sulphurous anhydride $SO_2$ and copper oxide CuO are produced, CuO being returned to the IIIrd alkali regeneration step.

The concentrated caustic soda solution obtained in the Ist alkali regeneration step and contaminated with sodium sulphide $Na_2S$ is subjected to caustification operation with copper oxide CuO, this caustification treatment being carried out similarly to the IIIrd alkali regeneration step.

Further on, the caustic soda solution obtained by the IIIrd alkali regeneration step is combined with the caustic soda solution obtained by the Ist regeneration step and subjected to caustification treatment. The combined caustic soda solution is subjected dewatering and, as a result, a caustic soda melt is obtained which is returned to the reaction zone.

Amongst drawbacks of the latter process for lead recovery from plumbiferous concentrates, one should mention considerable expenses for carrying out alkali regeneration because of the need to organize additional production units for regeneration of the sulphidizing agent (i.e. barium sulphide) and causticizing agent (i.e. copper oxide).

The operations for regenerating barium sulphide and copper oxide are associated with the need to use high temperatures and are accompanied of environmentally harmful discharges of gaseous media (such as CO, $SO_2$, etc.).

Since a portion of sodium sulphide passes to the strong caustic soda solution, while its remaining portion —together with sodium sulphate—passes to the weak sodium sulphate solution obtained by the 2nd leaching operation, it becomes necessary to causticize sodium sulphide in both branches of the process flow-sheet, whereby it becomes much complicated.

Besides, operation with solutions containing sodium sulphide calls for considerable expenditure for environment protective measures to prevent discharges of hydrogen sulphide to the environment.

BRIEF DESCRIPTION OF THE INVENTION

The present invention seeks to solve the problem of increasing the rate of recovery of lead and valuable concomitant elements from lead-containing feeds without inflicting damage to environment, of stepping up the process productivity, as well as of reducing materials and energy consumption rates.

The other object of the present invention is to reduce the dust formation.

Yet another object of the present invention is to increase the caustic soda regeneration rate from the melt.

In accordance with the above-formulated and other objects the essence of the present invention resides in that in a process for recovering lead from lead-containing feeds, comprising the steps of feeding molten caustic soda and a lead-containing feed into a reaction zone having a temperature of from 600° to 700° C., conducting a chemical reaction within said reaction zone to produce lead metal withdrawn from the process and a melt containing caustic soda, sodium sulphate, zinc sulphide, copper sulphide and barren gangue, removing said melt from the reaction zone and subjecting it to a first leaching operation to obtain a slurry constituted by a mixture of solid particles of sodium sulphate, ZnS, $Cu_2S$, barren gangue and an aqueous solution containing mainly caustic soda, filtering the slurry thus-obtained to produce a strong aqueous solution containing mainly caustic soda and a solid residue consisting essentially of sodium sulphate, ZnS, $Cu_2S$ and barren gangue, subjecting said solid residue to a second leaching operation to obtain a suspension constituted by a mixture of solid particles of ZnS, Cu$_2$S, barren gangue and an aqueous solution containing essentially sodium sulphate, subjecting said suspension to fultering to produce thereby a cake constituted by solid particles of ZnS, Cu$_2$S and barren gangue carrying, adsorbed on their surface, a sodium sulphate solution and an aqueous solution containing essentially sodium sulphate, washing said cake to eventually produce a sodium sulphate solution and a washed cake containing essentially ZnS, Cu$_2$S and barren gangue, withdrawing the cake thus-produced from the process, dewatering the resulting strong aqueous solution containing essentially caustic soda to produce a caustic soda melt returned to the reaction zone, there have been introduced a number of improvements in accordance with the present invention, namely: an oxygen-containing gas is caused to bubble through the melt, said aqueous solution essentially containing sodium sulphate is subjected to electrochemical treatment, as a result of which a sulphuric acid solution removable from the process and a caustic soda solution are produced, the latter caustic soda solution being used as a solvent in said first leaching operation, while said sodium sulphate solution obtained by washing the cake being used as a solvent in said second leaching operation.

The above-claimed process takes place in the reaction zone and is described by the following chemical formula:

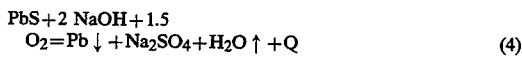

$$PbS + 2\,NaOH + 1.5\,O_2 = Pb\downarrow + Na_2SO_4 + H_2O\uparrow + Q \qquad (4)$$

The above-disclosed improvements offer the following advantages: they make it possible to increase the lead recovery percentage and to step up the process productivity by resorting to intensive stirring of a pulverized lead-containing feed and of the caustic soda melt by using an oxygen-containing gas, and also by shifting the thermodynamic reaction equilibrium between lead sulphide and caustic soda towards the lead reduction side; they make it possible to lower the power consumption by conducting the reaction between the lead-containing feed and caustic soda with an increased exothermic effect brought about by the nature itself of the reaction; these improvements make it possible to minimize the presence of sodium sulphide in the melt, whereby the operation of sodium sulphide caustification becomes unnecessary and the formation of hydrogen sulphide is avoided; these improvements make it possible to produce a pure concentrated caustic soda solution directed to the dewatering step, followed by directing the dewatered caustic soda to the reaction zone, and also to produce a pure sodium sulphate solution directed to electrochemical treatment.

The process in accordance with the present invention calls for reduced material expenses for regenerating alkali, since this process produces a melt with a low concentration of sodium salts.

When use is made of the process in accordance with the present invention, there are no discharges of sulphur-laden gases to atmosphere due to the fact that the sulphur is fully utilized in the form of sulphuric acid usable, e.g. for the production of technical-grade gypsum. To make up for alkali losses incurred during realization of the process of the present invention (such alkali losses are experienced during and also with the products withdrawn from the process, e.g. with the cake and outgoing gases), a fresh sodium sulphate solution is additionally fed to the step of electrochemical treatment of the Na$_2$SO$_4$ solution.

The above-indicated alkali losses may be made up also by additionally feeding an additional amount of fresh caustic soda to the reaction zone.

It is advisable that the lead-containing raw materials (feed) be granulated prior to their being fed to the reaction zone.

The fact that the lead-containing feed is admitted into the reaction zone in the form of granules considerably reduces the carry-away of material particles with water steam. As a result, savings are possible upon construction of dust-catching facilities. Moreover, use of the feed in the granular form prevents frothing of the melt.

It is advisable that the second leaching operation be carried out by repulping.

The point is that realization of the second leaching operation for treating a solid residue containing sodium sulphate, NaOH, zinc sulphide, copper sulphide and barren gangue by repulping serves to intensify extraction of sodium salts to solution and to increase the degree (depth) of their extraction.

It is necessary that the concentration of aqueous solution containing essentially caustic soda be maintained within the range of 350 to 450 g/dm$^3$ at a solids-to-liquid ratio of 1:2 in the slurry.

When the caustic soda solution concentration in the slurry is kept within the above-specified range, there takes place an insignificant sodium sulphate solubilization at a satisfactory filtration rate of this slurry.

If the caustic soda solution concentration in the slurry is below 350 g/dm$^3$, the sodium sulphate solubility therein increases, thereby worsening conditions for separating NaOH and Na$_2$SO$_4$ salts.

Should the caustic soda solution concentration in the slurry be kept above 450 g/dm$^3$ level, the slurry viscosity increases and the slurry filtration rate declines.

It is advisable that the aqueous solution concentration containing essentially sodium sulphate be maintained within 170 to 200 g/dm$^3$.

Should the sodium sulphate salt concentration in the solution be kept below 170 g/dm$^3$, it will give rise to an increased amount of the solution to be treated and, consequently, to an increased energy consumption for conducting the electrolysis. Should the sodium sulphate salt concentration in the solution exceed 200 g/dm$^3$, sodium sulphate crystals are formed, whereby conditions for delivering the solution to the electrolysis and also conditions for conducting the electrolysis itself are disturbed.

It is advisable that, as said oxygen-containing gas, use be made of air consumed at a rate of 0.1 to 0.5 cub. m per 1 kg of the lead-containing feed (by weight).

With an air consumption rate of below 0.1 cub. m/kg, oxidation of Na$_2$S is not complete, thereby complicating the caustic soda regeneration from the melt. Should the air consumption rate exceed 0.5 cub. m/kg oxidation of iron and zinc sulphides present in the feed takes place, thereby increasing the consumption rate of caustic soda fed into the reaction zone and complicating its regeneration procedure.

Brief Description of the Drawing

The essence of the present invention will be better understood with the help of its following specific embodiment, accompanied by a drawing representing the flow-sheet of lead recovery by the process in accordance with the present invention.

The process in accordance with the present invention for recovering lead from lead-containing raw materials (feed), such as, e.g. sulphide concentrates is carried into effect as follows:

Pulverized concentrates, prior to their being fed into the reaction zone, are subjected to granulation, e.g. in a pan granulator, using, as binder, an aqueous caustic soda solution to eventually obtain 2-10 mm dia. granules. The granules thus-prepared are dried in air and fed into the reaction zone, e.g. into an electric furnace, whereinto molten caustic soda in a ratio of 0.7-1.2:1 and an oxygen-containing gas, such as, e.g. air, are fed in an amount of from about 0.1 to about 0.5 cub.m per 1 kg by weight of the concentrates. A temperature of 600° to 700° C. is maintained in the reaction zone.

The above-reported caustic soda-to-concentrate weight ratio is determined by the concentrate quality. The higher is the lead content and the lower are the Fe, $Al_2O_3$, CaO, etc. contents in the concentrate, the smaller is the amount of caustic soda to be fed into the reaction zone. Air is caused to bubble through the melt containing caustic soda, sodium salts, lead, zinc and copper sulphides, and barren gangue, such as, e.g. alumina, silica, calcium oxide, etc. Bubbling of the melt with the oxygen contained in the air intensifies the lead reduction process, the lead thus-reduced being withdrawn from the process.

The lead reduction process in the reaction zone takes place as follows:

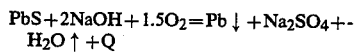

$$PbS + 2NaOH + 1.5O_2 = Pb\downarrow + Na_2SO_4 + H_2O\uparrow + Q$$

The lead reduction degree from the concentrate to metal is 97 to 99%, the basis metal content in the reduced lead accounting for 99.0 in 99.5%. In addition, this reduced lead accumulates more than 98% of noble metals and bismuth contained in the feed concentrate.

As the temperature within the reaction zone drops below 600° C., completeness is affected of oxidation of $Na_2S$ sodium sulphide (i.e. intermediate reaction product) to sodium sulphate $Na_2SO_4$. Should the temperature within the reaction zone rise above 700° C., caustic soda enters undesirable reactions with copper, zinc and iron sulphides, thus increasing the caustic soda consumption.

Besides, the temperature rise above 700° C. leads to alkali losses due to evaporation.

The above-reported air consumption rate of from 0.1 to 0.8 $m^3$/kg ensures preparation of a melt having an optimal chemical composition for subsequent regeneration of caustic soda from it.

Should the air consumption rate be below 0.1 $m^3$/kg, oxidation of $Na_2S$ is incomplete, whereby the caustic soda regeneration process from the melt is complicated. Should the air consumption rate be in excess of 0.5 $m^3$/kg, oxidation of iron and zinc sulphides present in the feed takes place, thereby increasing the caustic soda consumption in the reaction zone. The temperature within the reaction zone is maintained at the expense of the heat liberated during a reaction between lead sulphide and caustic soda in the presence of the oxygen of the air. Since the lead thus-recovered is buried under the melt bed, it is thus prevented from evaporation, and the environment is thus spared from the harmful effects of lead and its compounds.

Further on, the melt essentially containing caustic soda, sodium sulphate, zinc and copper sulphides, and gangue containing, e.g. alumina, silica, calcium oxide, etc. is withdrawn from the reaction zone and directed to a first leaching step. As a result of leaching, a slurry or pulp is obtained constituted essentially by a mixture of solid particles of sodium sulphate, ZnS, $Cu_2S$, a gangue and an aqueous solution containing essentially caustic soda. In the slurry, a weight solids-to-liquid ratio is maintained at 1:2, the slurry temperature at 110°-120° C., and the NaOH concentration in the solution 350 to 450 g/$dm^3$. The slurry is subjected to filtration to obtain an aqueous solution essentially containing caustic soda at a concentration of from 350 to 450 g/$dm^3$ and a solid residue containing essentially sodium sulphate, ZnS, $Cu_2S$ and a gangue. The solid residue has a moisture content of up to 15%. The strong alkaline solution thus-produced is directed to dewatering to obtain, as a result, molten caustic soda fed into the reaction zone. The resulting solid residue is directed to a second leaching step which is carried out be way of repulping in order to intensify extraction of sodium sulphate from the solid residue into solution and to increase the sodium sulphate recovery rate. Leaching is conducted at a temperature of 30° to 35° C. As a result of the second leaching step, suspension is obtained constituted by a mixture of solid particles of ZnS, $Cu_2S$, a gangue and an aqueous solution containing essentially sodium sulphate salt. This suspension is then filtered to obtain a solid residue, the so-called "cake", and an aqueous solution essentially containing sodium sulphate salt and having a concentration of from 170 to 200 g/$dm^3$. The cake represents a mixture of solid particles of ZnS, $Cu_2S$ and gangue saturated (up to 15%) with a solution adsorbed on the particle surface. Therefore, the cake is washed with water. As a result, a weak sodium sulphate solution is obtained which is directed to the second leaching step, while the cake is withdrawn from the process and later directed, e.g. to the zinc smelting production. The concentrated sodium sulphate solution is directed to electrochemical treatment, e.g. by electrodialysis or electrolysis to obtain, as a result, an alkaline NaOH solution having a concentration of from 180 to 200 g/$dm^3$ and directed to the first leaching step, and a sulphuric acid solution. The latter is withdrawn from the process and used, e.g. for gypsum production.

The process in accordance with the present invention for recovering lead from lead-containing feeds prevents environmental pollution. Melting the feed with caustic soda is conducted at low temperatures of 600° to 700° C., which rule out volatilization of highly toxic lead and its compounds to environmental air; losses of lead with dust are also prevented. There are no toxic sulphurous gases in the out-going process gases. Lead recoveries range between 97 and 99% depending on the lead content in the feeds. The alkali regeneration step used by the process in accordance with the present invention makes it possible to recover the alkali from the melt at up to 95%, and this high alkali recovery percentage is ensured by the closed-loop alkali regeneration circuit, in which no effluents nor discharges of pollutants to environmental air are present.

In what follows, there is reported a specific Example to illustrate the procedure used to recover lead from a sulphide lead-containing concentrate (from a 100-gram sample). Said concentrate containing (%% by weight): Pb 54.9; Zn 8.2; Cu 0.8; Fe 5.5 and S 16.0, was subjected to melting with 80 tons of caustic soda, which corresponds to a concentrate-to-alkali ratio equal to 1:0.8. Melting was conducted at 700° C. at an air consumption rate of 0.15 m³ per 1 kg of the concentrate. As a result of melting, there were obtained crude lead metal (54 tons, 99.5%-pure), a melt (134 tons) containing (wt. %): NaOH 40; $Na_2SO_4$ 31.5; Zn 6.5; Cu 0.2; S 12.4, the balance being the gangue and process gases consisting mainly of water steam.

The melt is directed to a first leaching step in which, as a solvent, use is made of an alkaline solution containing 203 g/dm³ of NaOH and an electrodialysis-produced sodium sulphate solution containing 208 g/dm³ of $Na_2SO_4$ and 70 g/dm³ of NaOH.

As a result of leaching, a slurry is obtained which is subjected to filtration. As a result, a solid residue and a strong alkaline solution are obtained. This alkaline solution contains 392 g/dm³ of NaOH and 2 g/dm³ of $Na_2SO_4$, which solution is directed to the dewatering step to be carried out using the procedure described in the book by M. B. Zelikin "Caustic Soda Production by Chemical Methods", Moscow, GOSKHIMIZDAT Publishers, 1961. As a result of the dewatering step, a 92%-melt of caustic soda is obtained to be directed to the reaction zone. The solid residue is directed to a second leaching step in which, as a solvent, use is made of a weak sodium sulphate solution containing from 20 to 40 g/dm³ of $Na_2SO_4$ and obtained by the cake washing operation. As a result of the second leaching step, a suspension is obtained which is subjected to filtration to obtain a cake and an aqueous solution containing 180 g/dm³ of $Na_2SO_4$ and 30 g/dm³ of NaOH. This solution is subjected to electrodialysis using the procedure described in the publicity booklet published by the company De Nora Permelee Hydrina "Membrane Electrolyzers". As a result, an alkaline solution containing 203 g/dm³ of NaOH, and a weak sulphuric acid solution containing 130 g/dm³ of $H_2SO_4$.

The cake withdrawn from the process contains (%% by weight): Fe 13.3; Zn 19.8; Cu 0.57; Pb 2.5; S 19.6; $SiO_2$ 8.7, moisture 15%.

The process in accordance with the present invention makes it possible to recover 99% of a 99.5%-pure lead and to regenerate 95% of 92%-pure caustic soda based on the weight of caustic soda fed into the reaction zone.

We claim:

1. A process for recovering lead from a feed containing the lead, said feed also containing zinc and copper sulphides and gangue, said process comprising:
   a) feeding molten caustic soda, the feed and an oxygen-containing gas into a reaction zone having a temperature of 600° to 700° C. to form lead metal and a melt containing a sodium sulphate, zinc sulphide, copper sulphide and gangue;
   b) removing said melt from the reaction zone and leaching said melt in a first leaching step to form a slurry comprising a mixture of solid particles of sodium sulphate, zinc and copper sulphides, and gangue and a first aqueous solution consisting essentially of caustic soda;
   c) filtering said slurry to separate said first aqueous solution from said mixture of said particles whereby to obtain a filtered aqueous strong solution consisting essentially of the caustic soda, and a solid residue consisting essentially of sodium sulphate, zinc and copper sulphides and gangue;
   d) dewatering said filtered aqueous strong solution consisting essentially of caustic soda;
   e) leaching said solid residue in a second leaching step to form a suspension comprising a second mixture of solid particles of zinc and copper sulphides, gangue and a second aqueous solution consisting essentially of sodium sulphide;
   f) filtering said suspension to separate said second mixture of solid particles from said second aqueous solution to obtain a cake comprising said solid particles of zinc and copper sulphides and gangue with a sodium sulphate solution adsorbed on its surface, and a filtered second aqueous solution consisting essentially of sodium sulphate;
   g) electrochemically treating said filtered second aqueous solution consisting essentially of sodium sulphate to obtain a sulfuric acid solution and a caustic soda solution;
   h) washing said cake to obtain a washed cake consisting essentially of zinc and copper sulphides and gangue, and a second sodium sulphate solution.

2. A process for recovering lead as claimed in claim 1, comprising the step of granulating said lead-containing feed prior to its being fed into the reaction zone.

3. A process for recovering lead as claimed in claim 1, wherein said second leaching step is carried out by repulping.

4. A process for recovering lead as claimed in claim 2, wherein said second leaching step is carried out by repulping.

5. A process for recovering lead as claimed in claim 1, wherein the concentration of said first aqueous solution consisting essentially of caustic soda is maintained within a range of from 350 to 450 g/dm³, with the slurry having a solids-to-liquid ratio of about 1:2.

6. A process for recovering lead as claimed in claim 4, wherein the concentration of said first aqueous solution consisting essentially of caustic soda is maintained within a range of from 350 to 450 g/dm³, with the slurry having a solids-to-liquid ratio of about 1:2.

7. A process for recovering lead as claimed in claim 1, wherein the concentration of said second aqueous solution consisting essentially of sodium sulphate is maintained within a range of from 170 to 200 g/dm³.

8. A process for recovering lead as claimed in claim 6, wherein the concentration of said second aqueous solution consisting essentially of sodium sulphate is maintained within a range of from 170 to 200 g/dm³.

9. A process for recovering lead as claimed in claim 1, wherein said oxygen-containing gas is air which is fed into the reaction zone in an amount of from about 0.1 to about 0.5 m³/kg based on the weight of the lead-containing feed.

10. A process for recovering lead as claimed in claim 8, wherein said oxygen-containing gas is air fed into the reaction zone in an amount of from about 0.1 to about 0.5 m³/kg based on the weight of lead-containing feed.

11. A process as claimed in claim 1 wherein the dewatered filtered aqueous strong solution is fed as a caustic soda melt into the reaction zone in step a of the process.

12. A process as claimed in claim 1 wherein the caustic soda solution obtained in step a is used as a solvent in said first leaching step.

13. A process as claimed in claim 1 wherein the second sodium sulphate solution is used as a solvent in the second leaching step.

14. A process as claimed in claim 1 further comprising recovering the sulfuric acid solution obtained in step g and the washed cake obtained in step h.

* * * * *